United States Patent Office 3,523,760
Patented Aug. 11, 1970

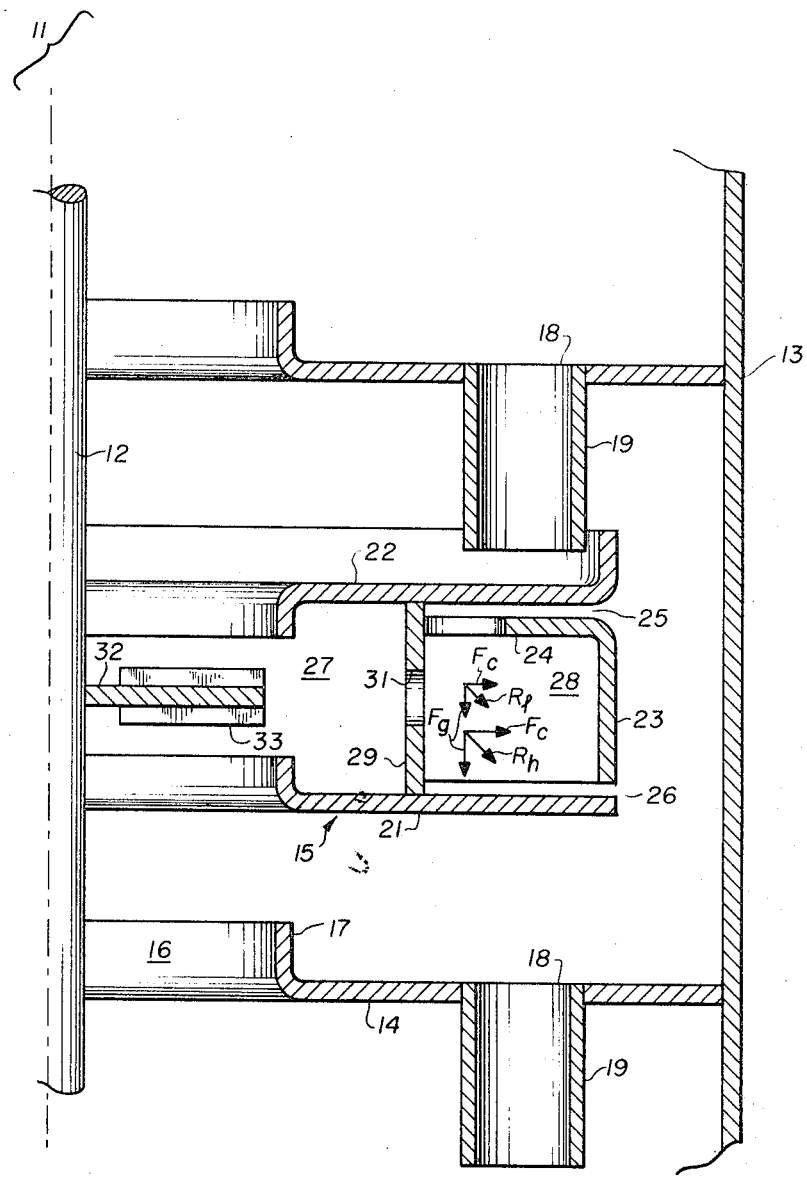

3,523,760
MULTISTAGE LIQUID-EXTRACTOR HAVING IMPROVED SEPARATING MEANS
Willi Wirz, Reinach, Switzerland, assignor to Hoffmann-La Roche Inc., Nutley, N.J., a corporation of New Jersey
Filed Mar. 28, 1969, Ser. No. 811,535
Claims priority, application Switzerland, Apr. 11, 1968, 5,499/68
Int. Cl. B01d *11/04*
U.S. Cl. 23—270.5      4 Claims

ABSTRACT OF THE DISCLOSURE

A multistage liquid-liquid extraction process and apparatus in extraction columns, where the separately incoming phases are stirred to generate a turbulent circular flow to provide a mixed emulsion at each of the stages, a separating chamber arrangement is provided for divorcing the emulsion from the turbulent formation but maintaining the laminary circular flow causing the emulsion to be separated into a lighter and heavier phase at different zones within the separating chamber, and separate exits are employed for conducting and discharging the separated phases to a settling area.

---

The present invention relates to a new method and improved apparatus for use in the counter-current extraction of liquids.

In the multistage exchange of material in liquid systems, it is necessary that an intensive mixing of the phases as well as a prompt demixing take place at each stage. In such systems it is common to utilize rotary motion, usually by way of a driven central shaft with horizontally extended stirrers or agitators, for accomplishing the mixing action. It is the purpose of the present invention to employ circular flow produced by rotary motion and to which the mixture is subjected to provide a technique for multistage liquid-liquid extraction in which the separation of the phases necessary in each stage of the column is effected. This is achieved by employing the circular flow so that the two phases are concentrated in different zones and are conducted by separate paths to settle.

In essence, the present invention is based on the use of centrifugal force and the force of gravity for the separation of the phases. The effect of centrifugal force comes into play when the emulsion existing after the mixing is virtually divorced from the turbulent formation leaving the emulsion to execute a laminar circular flow or rotating motion so that varingly large centrifugal forces act on the liquid particles having different densities. Accordingly, the heavier particles will accumulate further outward toward the column periphery to force the lighter particles to accumulate further inward toward the column center. Another feature of the present invention is the ability to regulate the effect of the centrifugal forces on the liquid particles for improved phase separation.

The invention is further concerned with an apparatus for carrying out the process discussed above, comprising an extraction column with several stages and a stirring device, the column containing in each stage an annular mixing and separating chamber which consists of a pair of spaced flat plates intermediate which is an inner cylindrical separating wall provided with perforations and a cylindrical outer wall. The outer wall is given a configuration so that an annular gap is formed between it and each of the flat plates whereby the mouth of each gap is common to a different zone in the mixing chamber enabling the heavier and lighter particles to be separately lead away. In addition, the rotative movement in the separating area provides the opportunity for the two liquids to combine on a long way to continuous phases.

Other objects, advantages and capabilities of the present invention will become apparent from the following detailed description taken in conjunction with the accompanying drawing, illustrating a preferred embodiment of the invention.

In the drawing, the figure represents the right half of a vertical cross section, largely diagrammatic, of the present invention.

With reference to the figure there is shown a half of a cross section of one liquid-liquid extraction stage of a column generally referred to as 11, having an axle 12 passing through the center of the column and a vertical cylindrical outer shell the representation of which in the drawing is designated as 13. In the stage unit is a stage-floor 14 and a mixing and separating chamber 15 situated between the stage-floor and the floor of the succeeding stage. The stage-floor is essentially a horizontal circular plate fitted flush within the column and defining at its inner portion a central circular aperture 16. The outer edge of the aperture 16 at the plate is bent and extended upwardly at 17 in collar-like fashion, toward the mixing and separating chamber 15. Intermediate the upward extension 17 and outer shell 13, are a series of openings 18, uniformly distributed in a concentric circle, each opening connected with a tubular pipe 19 projecting into a space associated with a subsequent stage.

The mixing and separating chamber 15 has an annular shape with a rectangular cross-section. It includes an annular flat floor-plate 21 and an annular flat top-plate 22, the plates being arranged apart from each other and having their inner edges curved inwardly so that they extend toward each other in collar-like fashion. The outer edge of the top plate is also curved but in a direction away from the chamber. Positioned intermediate plates 21 and 22 is a vertical cylindrical outer wall 23 with an upper edge 24 bent inwardly towards the axle 12 to depict an inverted L-shaped cross-section. The vertical wall 23 is positioned between the floor and top plates of the chamber to define a pair of horizontally extending narrow parallel passage ways 25, 26.

The mixing and separating chamber 15 is partitioned to form two compartments 27 and 28 by an inner cylindrical wall 29 having a number of perforations 31. The inner compartment 27 of the chamber is defined as the mixing area whereby the outer compartment 28 represents the separating area.

Adapted for connection with axle 12 at each stage along the column and opposite every mixing and separating chamber, is a horizontal stirring-disc 32 with upward and downward projecting stirring-ribs or blades 33 uniformly distributed about the disc periphery. In each case, the diameter of the central aperture 16 at the stage-floor 14 and the internal diameter of the mixing chamber is larger than the diameter of the stirring device represented in part by axle 12 and stirring disc 32. Thereby the stirring device, which passes through the entire column, may be removed without dismantling the column.

In reviewing the operation of the present invention assuming that the continuous phase in the column is formed from the light phase, the flow of material in the extraction column proceeds as follows:

The settled heavy phase flows from the floor of the next higher stage through the tubular connecting pipes 19 onto the top-plate 22 of the mixing chamber and thence, on the basis of the suction action of the stirrer, inwardly on to the stirring-disc 32. The lighter phase flows upwardly from the next lower stage through the central aperture 16 of the stage-floor to strike against the underside of the stirring-disc 32. Both phases are thrown together by the stirrer action into the compartment 27 of the mixing and separating chamber.

This action by means of the generated turbulence causes an intensive mixture and the phase mixture is subject to a circular flow. As the emulsion passes through perforations 31 of separating wall 29 into the compartment 28 of the chamber, the turbulent-formation is virtually suppressed, as desired, whereas the circulation-flow is merely slowed down, on passing through. At the circulation flow in compartment 28 a smaller centrifugal force $F_c$ acts on the liquid units of the lighter phase than on the liquid units of the heavier phase. In addition, a smaller gravitational force $F_g$ acts on the liquid units of the lighter phase than on the liquid units of the heavier phase. Accordingly, the resultant force $R_h$ acting on liquid units of the heavier phase is greater than the resultant force $R_l$ acting on liquid units of the lighter phase. As a consequence, the heavier phase material accumulates further in an outer zone of compartment 28 in the direction indicated by vector force $R_h$, to flow outward through the lower gap 26, whereas the lighter phase material is thus caused to be pushed upwardly to the inner zone of compartment 28 directing it to flow outwards through upper gap 25 commencing further inwards. As is conventional, outside the mixing chamber is situated the actual decantation area in which the phases completely settle out from each other. A small component of the circulation-flow could still persist in this area in order to promote the settling out.

It should be understood that by proper regulation of the circular flow, the number of perforations, and the perforation size, the centrifugal forces acting on the particles may be varied to optimize phase separation.

In an alternative embodiment the extraction column may be inverted whereby only provision has to be made that the upper edge 24 of the cylindrical outer wall 23 is positioned upwards.

I claim:
1. In a multistage liquid-liquid extraction column including a substantially vertical shell, inlet and outlet means in the top and the bottom of said column for said liquids, said column being divided into a plurality of vertically spaced stages by a plurality of plate means each having a central aperture and at least one other aperture each stage further including two vertically spaced flat annular plates each having a central aperture and stirring means disposed between the central apertures in said flat annular plates and arranged for rotation about a substantially vertical axis for mixing two separate liquids of different specific gravities in a turbulent circular flow, the improvement comprising:
inner perforated wall means disposed between said annular plates to define a central mixing chamber and an outer separating chamber for virtually maintaining in the separating chamber only laminar circular flow of the incoming mixed liquids about said vertical axis, and outer wall means disposed between and slightly spaced from said annular plates to define a pair of exits to a settling area outside of and adjacent said outer wall means, one of the exits restricted to communication with the separating chamber at an area adjacent said inner perforated means.

2. In an apparatus according to claim 1 wherein, the inner edges of the flat annular plates being curved toward each other and the other edge of one of said flat annular plates being curved away from said other flat annular plate means, and said other aperture in said stage means having a tube extending from the settling area of a prior stage towards said one plate.

3. In a multistage liquid-liquid extraction column including a substantially vertical shell, inlet and outlet means in the top and the bottom of said column for said liquids, a plurality of plate means dividing said column into a plurality of vertically spaced stages, said plate means being provided with a central aperture and at least one other aperture, each stage having a mixing means, said mixing means including two flat annular plates arranged apart from each other, each of said flat plates having a central aperture, stirring means disposed between the central apertures in said flat plate and arranged for rotation about a substantially vertical axis the improvement comprising:
an inner cylindrical wall provided with perforations and disposed between said plates to define a central mixing chamber and an outer separating chamber, an outer cylindrical wall disposed between and having its upper and lower edges spaced slightly from said flat plates, one of said edges being curved toward and extending to said inner wall and being provided with an opening adjacent said inner wall.

4. An apparatus according to claim 3 wherein, the inner edges of the flat plate being curved toward each other and the other edge of one of said flat plates being curved toward its adjacent plate means, said other aperture in said plate means having a tube extending towards said one plate.

References Cited

UNITED STATES PATENTS

| 2,594,675 | 4/1952 | Norell | 23—270.5 |
| 2,754,179 | 7/1956 | Whatley | 23—270.5 |
| 2,847,283 | 8/1958 | Figg | 23—270.5 |
| 2,850,362 | 9/1958 | Scheibel | 23—270.5 |
| 2,941,872 | 6/1960 | Pilo | 23—270.5 |
| 3,032,403 | 5/1962 | Kohl | 23—270.5 |
| 3,164,444 | 1/1965 | Andersson | 23—270.5 |
| 3,374,988 | 3/1968 | Eckert | 23—270.5 X |
| 3,389,970 | 6/1968 | Scheibel | 23—270.5 |

FOREIGN PATENTS

| 110,568 | 1964 | Czechoslovakia. |
| 585,517 | 10/1933. | Germany. |
| 1,279,027 | 2/1961 | France. |

NORMAN YUDKOFF, Primary Examinre

S. J. EMERY, Assistant Examiner

U.S. Cl. X.R.

23—310; 196—14.52

PO-1050
(5/69)

UNITED STATES PATENT OFFICE
CERTIFICATE OF CORRECTION

Patent No. 3,523,760          Dated August 11, 1970

Inventor(s) Willi Wirz

It is certified that error appears in the above-identified patent and that said Letters Patent are hereby corrected as shown below:

Column 1, line 1, Title of Invention -
"Multistage Liquid-Extractor Having Improved Separating Means" should be -- Multistage Liquid-Liquid Extractor Having Improved Separating Means --

SIGNED AND
SEALED
OCT 20 1970

(SEAL)
Attest:

Edward M. Fletcher, Jr.
Attesting Officer

WILLIAM E. SCHUYLER, JR.
Commissioner of Patents